Dec. 13, 1960 R. P. ADAMS 2,964,694
ELECTRICAL REGULATING APPARATUS
Filed Aug. 17, 1955
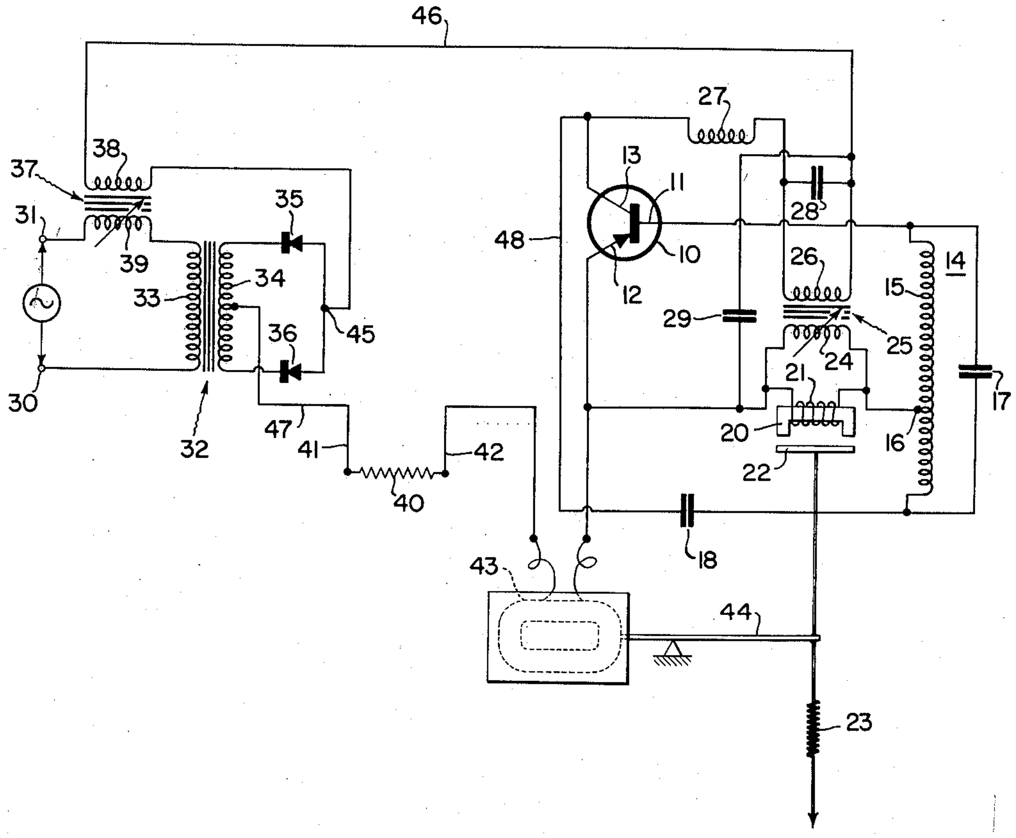
INVENTOR.
ROBERT P. ADAMS.
BY Henry L. Hanson
ATTORNEY.

Patented Dec. 13, 1960

2,964,694

ELECTRICAL REGULATING APPARATUS

Robert P. Adams, Elkins Park, Pa., assignor to Minneapolis-Honeywell Regulator Company, Minneapolis, Minn., a corporation of Delaware Filed Aug. 17, 1955, Ser. No. 529,031

7 Claims. (Cl. 323—7)

A general object of the present invention is to provide a new and improved electrical transducer. More specifically, the present invention is concerned with an improved motion to current transducer which is characterized by its high gain, its stability, and its reliability under varying current output conditions.

In a copending application of William J. Popowsky, entitled, "Electrical Control Apparatus," bearing Serial No. 442,264, and filed July 9, 1954, there is disclosed a motion to current transducer which comprises a transistor oscillator having a feedback circuit controlled by a variable impedance which varies the current drawn by the oscillator circuit from a power supply. Variations of the variable impedance are operative to produce proportional variations in the oscillator output current. The present invention is concerned with increasing the gain while retaining the stability of the transistor oscillator circuit, particularly when of the type disclosed in the Popowsky application. To that end, there is provided, in accordance with the present invention, a novel arrangement to introduce a regenerative signal in the oscillator circuit, and in particular, an arrangement in which the regenerative signal is derived from the direct current output of the oscillator circuit.

It is accordingly another object of the present invention to provide a transistor type of oscillator transducer the gain of which is increased by an output direct current signal, with said signal acting in a regenerative sense upon the oscillator circuit.

The gain increase in the present invention is achieved specifically by the use of a saturable impedance with the saturating winding of the saturable impedance connected in the direct current output circuit of the transducer. The saturating windings of the saturable impedance are effective to control the regeneration in the oscillator, and therefore, the level of oscillation of the apparatus. The saturating winding of the impedance is isolated from the alternating current signal in the oscillator even though the saturable impedance itself is operative to control the feedback.

It is, accordingly, a further object of the present invention to provide an improved oscillator the oscillation of which is controlled by a saturable impedance having a saturating winding energized by the output direct current drawn by the oscillator circuit.

In a known prior art form of transistor oscillator type transducer, it has been found that there is a maximum safe operating voltage which can be applied to the collector-emitter path of the control transistor. Thus, the voltage across the collector-emitter path is a maximum when there is no current flow in the oscillator output circuit. With large currents flowing in the collector-emitter path, it is possible to operate the circuit with the voltage of the power supply being considerably higher than under no current conditions due to the voltage drop across the load impedance. The present invention further contemplates the use of a voltage limiting means which is effective to lower the power supply output voltage when the output current of the transistor decreases.

It is therefore a further object of the present invention to provide a voltage limiting means to prevent the application of an excessive voltage to the collector-emitter path of a transistor circuit under certain operating conditions.

Still another object of the present invention is to provide a voltage limiter utilizing a saturable impedance the output current of which is regulated by the current drawn by a transistor control device.

The various features of novelty which characterize the invention are pointed out with particularity in the claims annexed hereto and forming a part of the specification. For a better understanding of the invention, its advantage, and specific objects attained with its use, reference should be had to the accompanying drawings and descriptive matter in which there is illustrated and described preferred embodiments of the invention.

Referring to the single figure, the numeral 10 represents a transistor which forms the amplifying device for the electrical oscillator of the present apparatus. This transistor comprises a base electrode 11, an emitter electrode 12, and a collector electrode 13. The oscillator circuit includes, in addition to the transistor 10, a resonant tank circuit 14 comprising an inductance coil 15 tapped at 16 and having a condenser 17 connected in parallel therewith. Also included in the oscillator circuit is a feedback condenser 18.

For controlling the effective feed back in the oscillator circuit, there is included a variable inductance 20 comprising a coil 21 wound upon an iron core of U shape with an iron element 22 movable relative to the open end of the core to vary the effective inductance of the coil 21. A spring 23 connects an input element to the element 22 to move the same.

Connected in parallel with the coil 21 is a saturable winding 24 of the saturable reactor 25. The control winding for the saturable reactor is indicated by the numeral 26. The latter is wound differentially with respect to winding 24 to avoid A.C. pickup in the D.C. winding. In series with the control winding 26 is an isolating choke 27. A condenser 28 is connected across the winding 26 and a further condenser 29 is connected across the D.C. supply leads to the transistor 10.

Power is supplied to the oscillator circuit from a pair of input terminals 30 and 31. The input terminals 30 and 31 are connected to a transformer 32 having a primary winding 33 and a tapped secondary winding 34, the latter of which has connected to its end terminals a pair of rectifiers 35 and 36.

In series with the primary winding 33 is a saturable reactor 37 having a control winding 38 and a saturable winding 39. The control winding 38 is differentially wound with respect to winding 39 to avoid A.C. being induced in the D.C. winding. A load, represented by a resistor 40 is adapted to be connected to the output terminals 41 and 42. The alternating current frequency of the oscillator is isolated from the output terminals by means of a feedback coil 43. The coil 43 may well take the form of the coil disclosed and claimed in the copending application of Philip E. Shafer, Serial No. 433,505, filed June 1, 1954. The coil 43 acts through a pivoted beam 44 to force balance the input force tending to move the core 22.

In considering the operation of the apparatus, it is first assumed that direct current power for the transistor 10 is rectified by the rectifier 35 and 36. The direct current circuit for the oscillator may be traced from the junction 45 between rectifiers 35 and 36 through the control winding 38 of the saturable reactor 37, the lead 46, control winding 26 of the saturable reactor 25, choke 27, collector 13, emitter 12, resistor 40, and lead 47 back to the tap of the power transformer secondary 34. The oscillator output alternating current is blocked from the direct current output circuit by way of choke 27. However, the alternating current circuit for the oscillator may be traced from the collector electrode 13 through lead 48, condenser 18, the lower terminal of coil 15, tap 16, and coil 21 to the emitter electrode 12. The regeneration in the oscillator circuit is produced by the signal induced in the section of coil 15 between the tap 16 and the upper terminal of the coil. The signal on the upper terminal of the coil 15 is coupled directly to the base electrode 11.

The intensity of the oscillations of the oscillator circuit will be a direct function of the impedance of the coil 21 and the impedance of the saturable winding 24 of the saturable reactor 25. When the impedance of the coil 21 is low due to the member 22 opening the air gap of the core of the coil, the oscillation intensity will increase and there will be a consequent increase in the direct current drawn from the power supply by the oscillator circuit. The current in the output flowing through the coil 43 will produce a balancing force on core 22 to force balance the device and close the servo loop. With a greater amount of direct current flowing through the control winding 26, the impedance of the saturable winding 24 will decrease and this will act in a regenerative sense upon the oscillator circuit to increase the overall oscillation intensity. The resultant oscillation intensity increase will be accompanied by a further increase in the direct current flowing in the output direct current circuit and through the load device 40. The overall effect of the saturable reactor 25 is to increase the gain of the oscillator circuit so that there will be a larger direct current change through the load 40 per unit change in position of the core piece 22.

It will be readily apparent that if the core piece 22 is moved toward the core of coil 21, the inductance of the coil will increase. This increase will be reflected in a decrease in the oscillation intensity of the oscillator circuit. This decrease will produce a smaller direct current flowing through the load circuit and through the control winding 26 of the saturable reactor 25 so that the impedance of the saturable winding 24 will also increase. This will mean that the direct current flowing in the output leads will be less than would normally occur per unit change in position of the core piece 22.

As the direct current voltage applied to the emitter 12 and collector 13 normally increases when the oscillation intensity decreases, or the output direct current decreases, it is desirable to limit the voltage which is applied to these two electrodes. The voltage limiting is accomplished in the present apparatus by the saturable reactor 37. The saturable winding 39 is in series with the primary 33 of the transformer 32. When there is substantially no direct current flowing in the output circuit of the oscillator through leads 46 and 47, the current flow will be insufficient to saturate the saturable winding and consequently the impedance of the winding will be relatively high. Since the saturable winding 39 is in series with the primary winding 33, there will be a reduction in the voltage applied to the winding 33. With a smaller voltage on winding 33, there will also be a smaller voltage on the winding 34 and a consequent reduction in the voltage rectified and applied to the emitter 12 and collector 13.

As the output current of the oscillator increases, there will be a larger current flowing through the coil 38 so that the winding 39 will be saturated. With the winding 39 saturated, it will present a lower impedance in series with the primary winding 33 so that the output of the transformer on secondary 34 will be larger. As rectified, this larger voltage will compensate for an increased voltage drop across the resistor 40 so that the voltage on the emitter-collector circuit will remain substantially constant. The net effect of this control by the saturable reactor 37 is to cause a further increase in the gain of the overall circuit as well as provide protection of the transistor 10 under low current conditions. In other words, more power may be made available on the load impedance 40 when the present circuitry is employed. The condensers 28 and 29 serve to by-pass servo transients until the feedback coil 43 is effective and the voltage limiter can readjust itself to changes in the circuit output.

From the foregoing it will be readily apparent that there has been disclosed a high gain motion to current transducer incorporating a transistor oscillator circuit whose gain is increased by a saturable impedance in the oscillator circuit as well as by a saturable impedance in the power supply circuit.

While, in accordance with the provisions of the statutes, there has been illustrated and described the best form of the embodiments of the invention known, it will be apparent to those skilled in the art that changes may be made in the form of the apparatus without departing from the spirit of the invention as set forth in the appended claims and that in some cases, certain features of the invention may be used to advantage without a corresponding use of other features.

Having now described the invention, what is claimed as new and for which it is desired to secure by Letters Patent is:

1. An electrical oscillator comprising an electrical amplifying device having an output circuit and an input circuit, a regenerative alternating current coupling circuit connected between said output circuit and said input circuit, a direct current supply circuit connected to said output circuit, a saturable impedance element connected to said input circuit and having a direct current saturating winding, said impedance varying the regenerative feedback signal in said input circuit, and means connecting said output circuit and said direct current supply circuit in series with said direct current saturating winding.

2. An oscillator comprising a transistor amplifying device having a base, an emitter and a collector, a resonant electrical circuit having a tap, means connecting the tap and one end of said resonant circuit to the emitter-collector circuit of said transistor, means connecting said base to the other end of said circuit, a saturable impedance connected to said emitter in said circuit and having a saturating winding, a direct current power source, and means connecting said saturating winding in a series circuit with said collector-emitter circuit and said direct current power source.

3. An oscillator comprising a transistor amplifying device having a base, an emitter, and a collector, a resonant electrical circuit having a tap, means connecting the tap and one end of said resonant circuit to the emitter-collector circuit of said transistor, means connecting said base to the other end of said circuit, a saturable impedance connected to said emitter and said circuit and having a saturating winding, an oscillator power source, a second saturable impedance connected in series with said power source and having a saturating winding, means connecting said power source to the collector-emitter circuit of said transistor amplifying device, and means connecting the saturating windings of both of said saturable impedance in said collector-emitter circuit.

4. An oscillator comprising a transistor amplifying device having a base, an emitter and a collector, a resonant electrical circuit having a tap, means connecting the tap and one end of said resonant circuit to the emitter-collector circuit of said transistor, means connecting said base to the other end of said circuit, an oscillator source of power, a saturable impedance connected to said source of power to regulate the output thereof and having a saturating winding, means connecting the output of said source to the emitter-collector circuit of said transistor amplifying device, and means connecting said saturating winding in series with said last named circuit.

5. An oscillator comprising a transistor amplifying device having a base, an emitter and a collector, a resonant electrical circuit having a tap, means connecting the tap and one end of said resonant circuit to the emitter-collector circuit of said transistor, means connecting said base to the other end of said circuit, a saturable impedance connected to said emitter and said circuit and having a saturating winding, a mechanically variable impedance connected in parallel with said saturable impedance, a direct current power source, and means connecting said saturating winding in series with said collector-emitter circuit and said direct current power source, said mechanically variable impedance varying the direct current flowing in said collector-emitter circuit and the direct current in said saturating winding acting regeneratively on said saturable impedance to increase the gain of said oscillator.

6. A motion to current transducer comprising an electrical oscillator circuit having a regenerative feedback circuit and an output circuit, a direct current source connected to said output circuit, an input motion responsive impedance means for controlling the operation of said oscillator whereby to control the direct current from said source applied to said output circuit, a regenerative feedback circuit control impedance having a feedback impedance control means, said feedback control impedance being connected in said feedback circuit, and means connecting said feedback impedance control means in series with said output circuit.

7. A motion to current transducer comprising an electrical oscillator circuit having a regenerative feedback circuit and an output circuit, a direct current source connected to said output circuit, an input motion responsive impedance means for controlling the operation of said oscillator whereby to control the direct current from said source applied to said output circuit, a regenerative feedback circuit control impedance having a feedback impedance control means, said feedback control impedance being connected in said feedback circuit, means connecting said feedback impedance control means in series with said output circuit, and an A.C. isolating means connected in series with said impedance control means so that only direct current from said output will pass therethrough.

References Cited in the file of this patent

UNITED STATES PATENTS

| | | |
|---|---|---|
| 1,697,126 | Mayer | Jan. 1, 1929 |
| 2,661,425 | Mittelman | Dec. 1, 1953 |
| 2,772,370 | Bruce et al. | Nov. 27, 1956 |

OTHER REFERENCES

Magazine: "Duality as a Guide in Transistor Circuit Design" Article, Bell Technical Journal, vol 30, April 1951, pp. 381–417, by Wallace et al.